United States Patent
Ishioka

(10) Patent No.: US 9,481,228 B2
(45) Date of Patent: Nov. 1, 2016

(54) VEHICLE WINDSHIELD

(71) Applicant: ASAHI GLASS COMPANY, LIMITED, Tokyo (JP)

(72) Inventor: Hideki Ishioka, Tokyo (JP)

(73) Assignee: ASAHI GLASS COMPANY, LIMITED, Tokyo (JP)

(*) Notice: Subject to any disclaimer, the term of this patent is extended or adjusted under 35 U.S.C. 154(b) by 28 days.

(21) Appl. No.: 14/682,524

(22) Filed: Apr. 9, 2015

(65) Prior Publication Data

US 2015/0210144 A1    Jul. 30, 2015

Related U.S. Application Data

(63) Continuation of application No. PCT/JP2013/077373, filed on Oct. 8, 2013.

(30) Foreign Application Priority Data

Oct. 15, 2012  (JP) .................. 2012-228065

(51) Int. Cl.
*B60J 1/00* (2006.01)
*C03C 17/32* (2006.01)
(Continued)

(52) U.S. Cl.
CPC ..... *B60J 1/002* (2013.01); *B60J 1/02* (2013.01); *C03C 17/25* (2013.01); *C03C 17/32* (2013.01);
(Continued)

(58) Field of Classification Search
CPC ........... B60J 1/002; B60J 1/02; C03C 17/25; C03C 17/32; C03C 17/3405; C03C 17/42; C03C 2217/478; C03C 2217/485; C03C 2217/75
See application file for complete search history.

(56) References Cited

U.S. PATENT DOCUMENTS 4,959,270 A * 9/1990 Hasegawa ......... B32B 17/10174
219/203
5,414,240 A * 5/1995 Carter ............... B32B 17/10036
219/203
(Continued)

FOREIGN PATENT DOCUMENTS

CN    101547804 A    9/2009
EP    2 095 981 A1   9/2009
(Continued)

OTHER PUBLICATIONS

English translation of the International Preliminary Report on Patentability and Written Opinion issued Apr. 30, 2015 in PCT/JP2013/077373.
(Continued)

*Primary Examiner* — Lori L Lyjak
(74) *Attorney, Agent, or Firm* — Oblon, McClelland, Maier & Neustadt, L.L.P.

(57) ABSTRACT

There is provided a vehicle windshield which can decrease chances of a fogging to occur by having an antifogging property, and under a situation that a fogging occurs, it is able to allow a driver to easily and surely recognize an occurrence state of the fogging in its initial state without adversely affecting visibility. The vehicle windshield has a window glass, a strip-shaped black ceramic layer, and a water absorbing antifogging film, wherein the water absorbing antifogging film has a thin-film area located outside a visual field area where a visual field of a driver is ensured in the vehicle windshield and inside an area where the black ceramic layer is formed, the thin-film area having a maximum film thickness in a range of 30% to 70% of a minimum film thickness in the visual field area and having a size recognizable by the driver when a fogging occurs.

13 Claims, 3 Drawing Sheets

(51) Int. Cl.
*C03C 17/42* (2006.01)
*B60J 1/02* (2006.01)
*C03C 17/25* (2006.01)
*C03C 17/34* (2006.01)

(52) U.S. Cl.
CPC ........... *C03C 17/3405* (2013.01); *C03C 17/42* (2013.01); *C03C 2217/478* (2013.01); *C03C 2217/485* (2013.01); *C03C 2217/75* (2013.01)

(56) References Cited

U.S. PATENT DOCUMENTS

| | | |
|---|---|---|
| 2009/0239017 A1 | 9/2009 | Ishioka |
| 2011/0012799 A1* | 1/2011 | Saito ................... H01Q 1/1271 |
| | | 343/713 |
| 2013/0260145 A1 | 10/2013 | Kishikawa et al. |

FOREIGN PATENT DOCUMENTS

| | | |
|---|---|---|
| JP | 10-048124 | 2/1998 |
| JP | 10-060141 | 3/1998 |
| JP | 2001-219818 | 8/2001 |
| JP | 2008-273076 | 11/2008 |
| WO | WO 2008/069186 A1 | 6/2008 |

OTHER PUBLICATIONS

International Search Report issued Dec. 10, 2013 in PCT/JP2013/077373 filed Oct. 8, 2013.

* cited by examiner

VEHICLE WINDSHIELD

CROSS-REFERENCE TO RELATED APPLICATIONS

This application is a continuation of prior International Application No. PCT/JP2013/077373 filed on Oct. 8, 2013 which is based upon and claims the benefit of priority from Japanese Patent Application No. 2012-228065 filed on Oct. 15, 2012; the entire contents of all of which are incorporated herein by reference.

FIELD

The present invention relates to a vehicle windshield, and particularly relates to a vehicle windshield having an antifogging property and being partially provided with an area where occurrence of fogging can be recognized.

BACKGROUND

When a fogging generated by moisture aggregating on and adhering to a glass surface due to temperature change or increase in humidity on a vehicle windshield occurs in a wide range of a visual field area for securing a visual field of a driver (hereinafter referred to as a "visual field area"), this adversely affects driving. Accordingly, an antifogging means suppressing occurrence of a fogging in a vehicle, such as, specifically, a means for sending wind to a windshield surface, a means for directly adjusting a glass temperature such as a glass having a heat wire, or the like is provided, and a response to a fogging is made by operating this means. Further, adjusting air conditioning, or the like is also a typical response made for antifogging.

These responses for antifogging are normally started in a stage that a fogging starts to occur, and when the timing to start the antifogging response delays, the fogging spreads through the visual field area and hinders driving. Accordingly, if an initial state of a fogging to occur on the vehicle windshield can be detected and the timing to start the antifogging response can be made early, the visual field area can be maintained constantly in a favorable state. From this viewpoint, for example, a method and a device for detecting a fogging on the vehicle windshield described in Patent Reference 1 (JP-A H10-048124) have been developed. However, they require optical measurement and hence it cannot be said that they are simple and able to accurately detect a fog.

On the other hand, there has been proposed use of a glass provided with an antifogging film for vehicle windshield by providing an antifogging film including a water absorbing resin, for example, a water absorbing crosslinked resin layer obtained from polyepoxides, on a glass surface and absorbing and removing minute water droplets which cause a fogging (See Patent Reference 2 (JP-A 2008-0273076)). With such a glass with an antifogging film, occurrence of fogging on the windshield can be suppressed or delayed to a certain level, but a fogging occurs when moisture aggregates and adheres onto the windshield and exceeds the water absorbing ability of the antifogging film. Accordingly, when the glass with the antifogging film is used for a vehicle windshield, chances of the fogging to occur and the antifogging response to be carried out decrease, but when the fogging occurs once, the typical response for antifogging is carried out similarly to the above. At this time, when the timing to start the antifogging response delays, the above problem that the fogging spreads through the visual field area and the driving is hindered can similarly occur.

DISCLOSURE OF THE INVENTION

It is an object of the present invention to provide a vehicle windshield which can decrease chances of a fogging to occur by having an antifogging property, and under a situation that a fogging occurs, it is able to allow a driver to easily and surely recognize an occurrence state of the fogging in its initial state without adversely affecting visibility.

The present invention provides a vehicle windshield having a window glass, a strip-shaped black ceramic layer formed in a peripheral portion of the window glass, and a water absorbing antifogging film provided on a vehicle-interior side surface of the window glass, the water absorbing antifogging film having an end portion existing more inside than an end portion of the window glass and within a formation area of the black ceramic layer, wherein the water absorbing antifogging film has a thin-film area located outside a visual field area where a visual field of a driver is ensured in the vehicle windshield and inside an area where the black ceramic layer is formed, the thin-film area having a maximum film thickness in a range of 30% to 70% of a minimum film thickness in the visual field area and having a size recognizable by the driver when a fogging occurs.

According to the present invention, it is possible to provide a vehicle windshield which can decrease chances of a fogging to occur by having an antifogging property, and under a situation that a fogging occurs, it is able to allow a driver to easily and surely recognize an occurrence state of the fogging in its initial state without adversely affecting visibility.

DETAILED DESCRIPTION

Hereinafter, embodiments of the present invention will be described. Note that the present invention is not limited to these embodiments, and these embodiments can be changed or modified without departing from the spirit and the range of the present invention.

A vehicle windshield of the present invention is a vehicle windshield having a window glass, a strip-shaped black ceramic layer formed in a peripheral portion of the window glass, and a water absorbing antifogging film provided on a vehicle-interior side surface of the window glass, the water absorbing antifogging film having an end portion existing more inside than an end portion of the window glass and within a formation area of the black ceramic layer, wherein the water absorbing antifogging film has a thin-film area located outside a visual field area where a visual field of a driver is ensured in the vehicle windshield and inside an area where the black ceramic layer is formed, the thin-film area having a maximum film thickness in a range of 30% to 70% of a minimum film thickness in the visual field area and having a size recognizable by the driver when a fogging occurs.

In this specification, the peripheral portion of the window glass means an area having a certain width from the end portion of the window glass toward a center portion of a main surface. Further, in the present invention, on the main surface of the window glass, a direction from the center portion to the end portion is called an outer peripheral direction, and a direction from the end portion to the center portion is called an inner peripheral direction.

In a vehicle using the vehicle windshield of the present invention, chances of a fogging to occur on the windshield can be decreased by that the vehicle windshield has a water absorbing antifogging film in a predetermined area in a vehicle-interior side surface. Moreover, by that the water absorbing antifogging film has, on outside of the visual field area, a thin-film area having a thin film thickness by a predetermined ratio as compared to a film thickness in the visual field area, under a situation that a fogging occurs on the windshield, the driver can recognize occurrence of fogging in an initial stage in the thin-film area where a fogging occurs easily, and can make a response for antifogging, such as activating an antifogging means or switching an air-conditioning setting, while sufficiently securing visibility in the visual field area. Accordingly, the visual field area can always keep a state of having favorable visibility.

Figure 1:
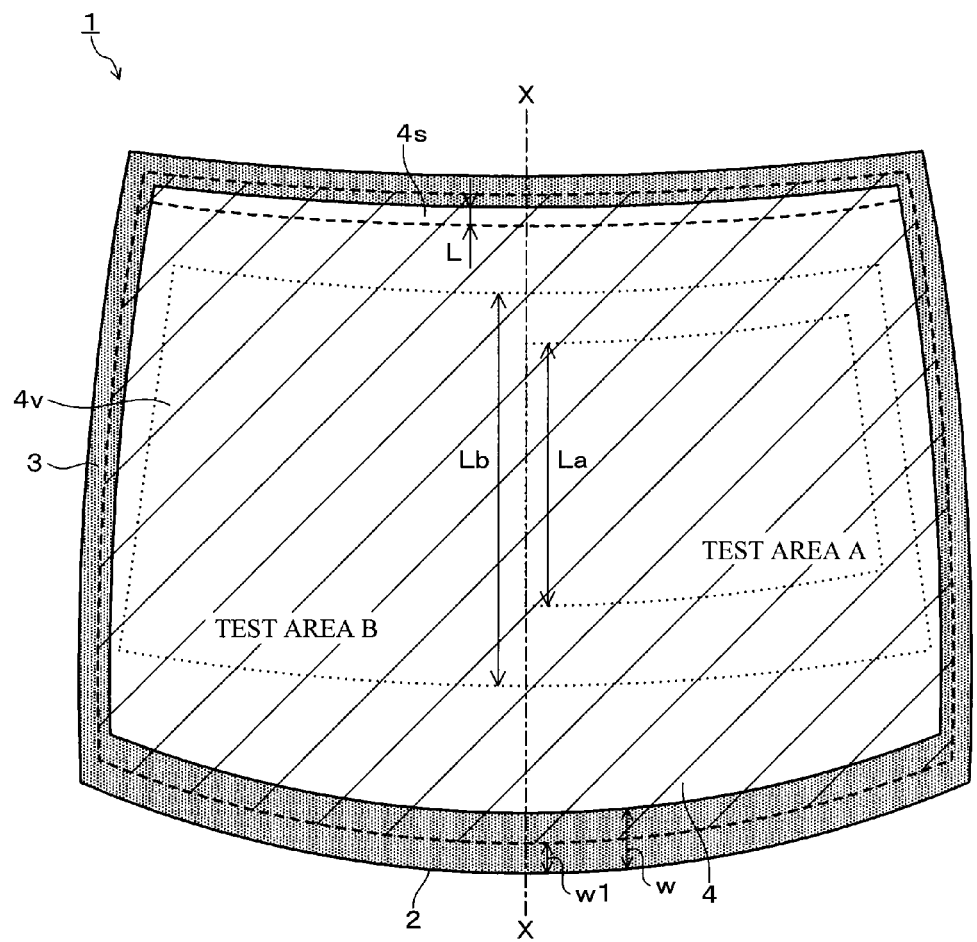
FIG. 1 is a front view of an example of an embodiment of a vehicle windshield of the present invention.
Figure 2:
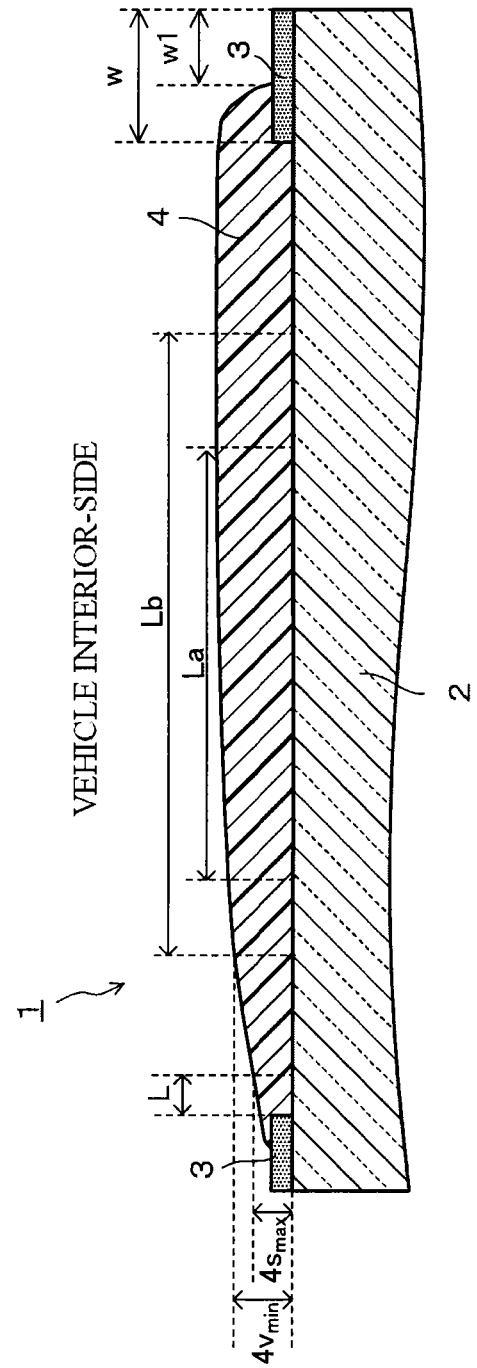
FIG. 2 is a cross-sectional view taken along a line X-X of the vehicle windshield illustrated in FIG. 1.

Hereinafter, an embodiment of a vehicle windshield of the present invention will be described with reference to drawings. FIG. 1 illustrates a front view seen from a vehicle-interior side in an example of the embodiment of the vehicle windshield of the present invention. FIG. 2 illustrates a cross-sectional view taken along a line X-X of the vehicle windshield illustrated in FIG. 1. An upper side of the front view of FIG. 1 corresponds to an upper side of the vehicle windshield. In the cross-sectional view of FIG. 2, a left side is the upper side of the vehicle windshield.

Here, descriptions "upper side" and "lower side" used in the following explanation mean an upper side and a lower side, respectively, when the vehicle windshield is mounted on a vehicle.

A vehicle windshield 1 (hereinafter also referred to as "windshield") has a window glass 2 and a strip-shaped black ceramic layer 3 formed in a peripheral portion of the window glass 2, and a water absorbing antifogging film 4 provided on a vehicle-interior side surface of the window glass 2, the water absorbing antifogging film having an end portion existing more inside than an end portion of the window glass 2 and within a formation area of the black ceramic layer 3.

As the window glass 2, normally, a window glass used for a vehicle windshield can be used without any particular limitation. Specifically, a window glass constituted of plastic, glass, or a combination thereof (laminated material or the like) is preferably used as the window glass 2.

An ordinary soda lime glass (also called a soda lime silicate glass), borosilicate glass, non-alkali glass, quartz glass, or the like can be used as the glass without any particular limitation. Among others, the soda lime glass is particularly preferred. A glass absorbing ultraviolet rays and/or infrared rays may also be used. A method of formation thereof is not particularly limited, and for example, a glass plate formed by a float method or the like is preferred. As the plastic, an acrylic resin such as polymethyl methacrylate, an aromatic polycarbonate-based resin such as polyphenylene carbonate, or an aromatic polyester-based resin such as polyethylene terephthalate (PET) may be mentioned, and among them, an aromatic polycarbonate-based resin is preferred.

The window glass 2 is selected appropriately according to a vehicle to which the windshield 1 is applied, and a single window glass constituted of the above-described glass materials or a laminated glass such that an intermediate film is sandwiched between two glass plates is preferred.

The shape and thickness of the window glass 2 can be selected appropriately depending on a vehicle to which the windshield 1 is applied. The shape of the window glass 2 may be a flat plate or may entirely or partially have a curvature. The thickness of the window glass 2 is preferably 1 to 10 mm in general.

In the windshield 1 illustrated in FIG. 1 and FIG. 2, the black ceramic layer 3 is formed in a strip shape on all four sides of a peripheral portion of the vehicle-interior side surface of the window glass 2, in other words, formed in a frame shape. The black ceramic layer 3, normally provided in this manner, serves a role of covering an attachment portion of the windshield to a vehicle body.

When a single substrate such as a single window glass is used as the window glass in the windshield of the present invention, the black ceramic layer is provided on at least one main surface of the window glass. The black ceramic layer is preferred to be provided on the vehicle-interior side surface of the window glass 2 as on the windshield 1, but may be provided on a vehicle-exterior side surface as necessary. Further, when a laminated glass is used as the window glass, the black ceramic layer may also be formed on a vehicle-interior side surface of a glass plate on a vehicle-exterior side.

Further, regarding the peripheral portion where the black ceramic layer is formed, the black ceramic layer need not necessary be formed in all the four sides of the peripheral portion, and a mode such that the black ceramic layer is formed in part of the peripheral portion is also included in the present invention. Further, the width of the black ceramic layer denoted by "w" in FIG. 1 and FIG. 2 needs to be covered and need not necessary be the same in the upper, lower, left and right sides. Moreover, it is also not necessary to be the same from an edge to an edge in a certain side. The width of the black ceramic layer may be set wider in, for example, a lower side than other three sides so as to cover a housing part of a wiper or the like, and it is possible to set the width wider in the vicinity of an attachment part for various sensors in an upper side so as to cover the attachment part and narrower in other areas. Specifically, the width of the black ceramic layer is preferably in the range of 5 mm to 300 mm, more preferably 10 mm to 200 mm.

A black ceramic layer formed on the window glass 2 by a conventionally publicly known method can be applied as the black ceramic layer 3 without any particular limitation. Specifically, a black ceramic layer may be mentioned which is formed by applying a black ceramic paste in a desired area on the window glass 2 by printing or the like and heating and baking the paste, the black ceramic paste being prepared by adding powder of heat resistant black pigment to resin and solvent together with low-melting point glass powder and kneading them.

Note that the "black" of the black ceramic layer may be adjusted so as not to transmit visible lights to a degree that at least a portion needed to be covered can be covered. From this viewpoint, the black pigment to be used includes a combination of pigments which become black by combining plural colored pigments.

Further, from the same viewpoint, the black ceramic layer may be formed as a sequential integrated film in its entire layer, or may be formed in a dot pattern which is an aggregate of minute dots, or the like.

The shape of the dots is not limited to a circle, and can also be an ellipse, a rectangle, a polygon, a star, or the like. Further, a dot pattern in which dot parts are transparent and the other part is the black ceramic layer can also be made. Moreover, the dots may be formed while varying a size and/or an interval within a formation area of the black ceramic layer. For example, when the black ceramic layer is formed of a dot pattern in a peripheral portion of an antifogging glass article, an area ratio of transparent parts can be increased in an inner peripheral direction of the antifogging glass article by decreasing the dot size or increasing the interval between dots with distance in the inner peripheral direction.

The thickness of the black ceramic layer is not particularly limited as long as falling within a range that they do not cause any trouble in visibility and adhesiveness of the water absorbing antifogging film to be formed thereon. The black ceramic layer is preferably formed to have a thickness of about 8 μm to 20 μm, more preferably 10 μm to 15 μm.

In the windshield 1 illustrated in FIG. 1 and FIG. 2, the water absorbing antifogging film 4 is provided on substantially the entire surface to have a part overlapped with the black ceramic layer 3 formed in the peripheral portion on the vehicle-interior side surface of the window glass 2. Specifically, the water absorbing antifogging film 4 provided to have an end portion existing more inside by "w1" (where it is in relation of w>w1) than an end portion of the window glass 2 and within a formation area of the black ceramic layer 3. Note that in FIG. 1, a dashed line depicted within the formation area of the black ceramic layer 3 indicates the position of the end portion of the water absorbing antifogging film 4. The end portion of the window glass 2 and an outer peripheral end of the black ceramic layer 3 match, and thus the end portion of the water absorbing antifogging film 4 is located more inside by "w1" than the outer peripheral end of the black ceramic layer 3, and is located more outside by "w-w1" than an inner peripheral end of the black ceramic layer 3. That is, an overlapping width of the water absorbing antifogging film 4 with the black ceramic layer 3 is "w-w1". Preferably, "w1" is ⅓ to ⅔ of "w".

In addition, when the black ceramic layer is not necessarily formed on the vehicle-interior side surface of the window glass in the laminated glass for example, the water absorbing antifogging film is formed so that its formation area overlaps with a part of the formation area of the black ceramic layer when the windshield is seen from the vehicle-interior side or the vehicle-exterior side.

In the windshield of the present invention, the water absorbing antifogging film has a thin-film area located outside a visual field area where a visual field of a driver is ensured in the windshield and inside an area where the black ceramic layer is formed, the thin-film area having a maximum film thickness in a range of 30% to 70% of a minimum film thickness in the visual field area and having a size recognizable by the driver when a fogging occurs.

In the windshield 1 illustrated in FIG. 1 and FIG. 2, a visual field area "4v" is set as a test area B specified in JIS R3212 (1998). The test area B is an area having larger dimensions out of two areas surrounded by dotted lines depicted inside the black ceramic layer 3 in FIG. 1. Further, an area having smaller dimensions inside the test area B is a test area A.

The test area A and the test area B are test areas each specified as a "test area of safety glass used on a front side" specified in JIS R3212 ("automobile safety glass test method", 1998). Note that the test area A in the windshield 1 illustrated in FIG. 1 is a test area A in the case of right-hand drive. In the case of left-hand drive, a laterally symmetrical position of the test area A illustrated in FIG. 1 with respect to a center line will be the test area A. In the present invention, the test area A is defined as an area where it is preferred that the visual field of the driver be minimally ensured for securing safety. Further, the test area B as an area including the test area A is defined as an area where it is more preferred that the visual field of the driver be ensured in the entire range of the area.

That is, the visual field area in the windshield of the present invention is preferably an area including the test area A specified in JIS R3212 (1998) from the viewpoint that it can be an area where safety can be ensured sufficiently, or more preferably is an area including the test area B.

In the windshield 1 illustrated in FIG. 1 and FIG. 2, the water absorbing antifogging film 4 has, with an inner periphery on an upper side of the formation area of the black ceramic layer 3 being one side, an area with a width L along this side as a thin-film area "4s". The width L of the thin-film area "4s" is preferably 20 mm or more, more preferably 30 mm or more. An upper limit of the width L is a distance between an inner periphery of the formation area of the black ceramic layer 3 and an outer periphery of a visual field area "4v" closest to this inner periphery.

In the windshield 1, the water absorbing antifogging film 4 has the thin-film area "4s" only on the upper side, but it is not limited to this in the present invention. The thin-film area may be provided in a frame shape inside the formation area of the black ceramic layer 3, or may be provided on one side other than the upper side of four upper, lower, left and right sides, or on a combination of two or three sides thereof. Further, the water absorbing antifogging film need not necessarily include the inner periphery of the formation area of the black ceramic layer 3 as the outer periphery, and may exist in an island form between the formation area of the black ceramic layer 3 and the visual field area "4v".

In the windshield of the present invention, the thin-film area of the water absorbing antifogging film just needs to have a maximum film thickness in a range of 30% to 70% of a minimum film thickness in the visual field area and having a size recognizable by the driver when a fogging occurs. As long as the above condition of film thickness is met, the thin-film area functions when it has a size of about 20 mm×50 mm. Therefore, when the water absorbing antifogging film has a thin film area having, for example, a width denoted by L in the views of 20 mm or more along the inner periphery of the formation area of the black ceramic layer 3 only on the upper side as in the water absorbing antifogging film 4 of the windshield 1 illustrated in FIG. 1 and FIG. 2, it can be said that the driver can sufficiently recognize occurrence of a fogging when it occurs in this area. Further, in view of securing production efficiency which will be described below, or the like, the thin-film area in the water absorbing antifogging film is preferably provided to have a width of 20 mm or more along the inner periphery of the formation area of the black ceramic layer only on the upper side. Further, the thin-film area is preferably provided on the upper side among the four sides in respect for that the driver can easily recognize it.

Further, a difference in film thickness between the thin-film area and the visual field area in the water absorbing antifogging film just needs to be such that the maximum film thickness of the thin-film area is in the range of 30% to 70%, preferably in the range of 50% to 70% of the minimum film thickness in the visual field area. The water absorbing antifogging film is basically a sequential film constituted of the same material in a surface direction, and has a correlation such that the larger the film thickness the larger the water absorbing antifogging property, as will be described below.

Therefore, in the water absorbing antifogging film, with the maximum film thickness of the thin-film area being in the range of 30% to 70% of the minimum film thickness in the visual field area, when the vehicle interior is in a state that a fogging can easily occur on the windshield, only the thin-film area of the water absorbing antifogging film on the windshield fogs to thereby allow the driver know this state, while having a certain degree of water absorbing antifogging property in the thin-film area. Then, due to that the visual field area of the water absorbing antifogging film has a sufficient film thickness and the water absorbing antifogging property is ensured, visibility in the visual field area is sufficiently ensured while the driver makes a response to improve the state that a fogging can easily occur, for example, while activating an antifogging means such as a means for blowing air to the windshield surface, a means for directly adjusting the glass temperature such as a heat wire glass, adjusting air conditioning, or the like. In addition, the specific film thickness is selected appropriately depending on the type of material of the water absorbing antifogging film, that is, water absorbing antifogging performance.

Here, the water absorbing antifogging film may be, as will be described later, laminated in a thickness direction, but is formed as one sequential film in the surface direction. It may be a problem in respect for production efficiency to produce, although technically possible, such a water absorbing antifogging film by making a portion thereof thin as the thin-film area in, for example, an island shape of the above-described minimum required size, and making a periphery thereof thick to a degree that a fogging does not occur. Further, in the relation of thickness between the thin-film area and the peripheral area, when the difference in film thickness is such that a step is made on the boundary of both the areas, a problem in visibility may occur. In particular, when the thin-film area and the visual field area are provided adjacently, a step inevitably occurs on the boundary for making the maximum film thickness of the thin-film area to be 30% to 70% of the minimum film thickness in the visual field area.

Therefore, as the water absorbing antifogging film provided on the windshield of the present invention, for example, a water absorbing antifogging film formed to have a certain distance between the thin-film area and the visual field area and to have a film thickness gradually increasing from the thin-film area toward the visual field area, as illustrated in FIG. 2, is preferred.

The film thickness of the water absorbing antifogging film 4 provided on the windshield 1 illustrated in FIG. 2 is thin in the upper side of the windshield 1, that is, left side, and gradually increases toward a lower side (right side in FIG. 2). The end portion of the water absorbing antifogging film 4 exists within the formation area of the black ceramic layer 3 in the upper side and the lower side. In the water absorbing antifogging film 4, the thin-film area "4s" is an area having a width L from an inner periphery of the formation area of the black ceramic layer 3 on the upper side, and the maximum film thickness thereof is a film thickness indicated by "$4s_{max}$" in FIG. 2 measured on a most inner side of the thin-film area "4s".

Further, the visual field area "4v" in the water absorbing antifogging film 4 is the area illustrated as the test area B in the front view of FIG. 1, and a central area illustrated to have a width of Lb in the cross-sectional view of FIG. 2. A minimum thickness of the visual field area "4v" is a film thickness indicated by "$4v_{min}$" in FIG. 2 measured on a most upper side of the visual field area "4v". In addition, an area illustrated to have a width La in the cross-sectional view of FIG. 2 is an area illustrated as the test area A in the front view of FIG. 1. Here, the relation between the maximum film thickness "$4s_{max}$" of the thin-film area "4s" and the minimum film thickness "$4v_{min}$" of the visual field area "4v" in the water absorbing antifogging film 4 is in the range of 30% to 70% as $(4s_{max}/4v_{min}) \times 100$.

The water absorbing antifogging film is not particularly limited as long as it is a film having a water absorbing property by a predetermined thickness and being highly transparent. Specifically, a saturated water absorption amount of the water absorbing antifogging film measured by the following method is preferably 300 to 600 mg/cm$^3$, more preferably 400 to 500 mg/cm$^3$. Further, the minimum film thickness of the visual field area is preferably 8 μm to 17 μm, more preferably 10 μm to 15 μm. The film thickness of the visual field area just needs to have a minimum film thickness in the above-described range, and the entire visual field area may have an even film thickness which is the same as the minimum film thickness, and may be structured such that the film thickness gradually increases from the upper side toward the lower side as in the visual field area "4v" of the water absorbing antifogging film 4 illustrated in FIG. 2. When the film thickness in the visual field area is thus uneven, the maximum film thickness of the visual field area is preferably 15 μm to 28 μm, more preferably 17 μm to 23 μm. Moreover, an average film thickness of the visual field area is preferably 10 μm to 25 μm, more preferably 15 μm to 20 μm.

Further, the maximum film thickness of the thin-film area of the water absorbing antifogging film is 5 μm to 12 μm, more preferably 7 μm to 10 μm. The film thickness of the thin-film area just needs to have a maximum film thickness in the above-described range, and the entire thin-film area may have an even film thickness which is the same as the maximum film thickness, and may be structured such that the film thickness gradually increases from the upper side toward the lower side as in the thin-film area "4s" of the water absorbing antifogging film 4 illustrated in FIG. 2. When the film thickness in the thin-film area is thus uneven, the minimum film thickness of the thin-film area is preferably 1 μm to 5 μm, more preferably 1.5 μm to 4.0 μm. Moreover, an average film thickness of the thin-film area is preferably 3 μm to 10 μm, more preferably 5 μm to 8 μm. In addition, if an area other than the thin-film area and the visual field area exists in the water absorbing antifogging film, a film thickness of this area is an area where a minimum film thickness is at least equal to or more than the maximum film thickness of the thin-film area.

When the saturated water absorption amount of the water absorbing antifogging film and the minimum film thickness of the visual field area are in the above ranges, the water absorbing antifogging film having a sufficient antifogging property can decrease chances of a fogging to occur on the windshield and also can sufficiently secure durability. Moreover, from the relation of film thickness between the visual field area and the thin-film area of the water absorbing antifogging film, under a situation that a fogging occurs, a fogging occurs only in the thin-film area on the windshield, allowing the driver to easily and surely recognize an occurrence state of the fog.

(Method of Measuring the Saturated Water Absorption Amount)

A substrate having the water absorbing antifogging film is used as a test piece, left in a room at a temperature of 25° C. and with relative humidity of 50±10% for 24 hours, and moreover left for 15 minutes or more in a thermo-hygrostat set to have a temperature of 25° C. and relative humidity of 90%. Immediately after removal from the thermo-hygrostat, a moisture amount (I) of the test piece is measured by using a micro moisture meter. Moreover, a moisture amount (II) is measured through a similar procedure only on a substrate not having the water absorbing antifogging film. A value obtained by dividing a value resulted from subtracting the moisture amount (II) from the moisture amount (I) by the volume of the water absorbing antifogging film is taken as the saturated water absorption amount.

In addition, the measurement of the moisture amount is performed as follows with a micro moisture meter FM-300 (made by Kett Electric Laboratory). A measurement sample is heated at 120° C. Vaporized products emitted from the sample are passed through activated carbons to remove vaporized products other than moisture, thereafter moisture is let absorbed by a molecular sieve in the micro moisture meter, and a mass change of the molecular sieve is measured as a moisture amount. Further, an end point of measurement is at a moment the change amount of mass per minute becomes 0.02 mg or less.

An evaluation can be carried out on a sample produced by using, for example, a soda lime glass substrate of 3 cm×4 cm×2 mm thickness (area of the water absorbing layer is 12 cm$^2$), but is not limited thereto.

Thus, the water absorbing property of the water absorbing antifogging film can be evaluated by using the saturated water absorption amount per volume and the film thickness of the water absorbing antifogging film as an index. Moreover, as the index indicating the water absorbing property of the water absorbing antifogging film, "antifogging time (seconds)" defined below indicating the water absorbing property of the water absorbing antifogging film itself may be used.

(Antifogging Time)

An antifogging time is such that a water absorbing antifogging film to be a sample is provided on a soda lime glass substrate having a predetermined shape and a size similar to the above, for example, 3 cm×4 cm×2 mm thickness, the substrate is left in a room at a temperature of 25° C. and with relative humidity of 50±10% for 24 hours, thereafter a surface of the water absorbing antifogging film is held above a hot tub at 35° C., and a time until a fogging in an area with a diameter of about 2 cm or more is recognized by visual observation is presented as an antifogging time (seconds).

As the water absorbing antifogging film having such a water absorbing property, for example, a water absorbing antifogging film including a water absorbing material such as water absorbing resin and porous inorganic particles may be mentioned. The water absorbing resin has a water absorbing property due to composite operations of a hydrophilic group existing in molecules and a cross-linked structure of the molecules, and the porous inorganic particles has a water absorbing property by having numerous micropores. When the water absorbing resin is used, the water absorbing antifogging film may be formed only of the water absorbing resin because the resin itself has film formability. When the porous inorganic particles are used, preferably, a water absorbing antifogging film is produced in a form such that a binder component is added and the porous inorganic particles are dispersed therein.

As the porous inorganic particles used for the water absorbing antifogging film, specifically, porous particles of various metal oxides, metal carbides, and metal nitrides may be mentioned. Porous particles of a silicon oxide, a titanium oxide, a zirconium oxide, or the like are preferred, and porous particles of a silicon oxide, for example, mesoporous silica is more preferred. As the porous inorganic particles, those having a mean primary particle diameter of about 5 nm to 100 nm and a mean micropore diameter of about 1 nm to 50 nm are preferred.

As the binder component contained in the water absorbing antifogging film together with the porous inorganic particles, a cured product obtained by hydrolyzing condensing an inorganic oxide, for example, metal alkoxide, or an organic resin, for example, silicone resin, acrylic resin, polyester resin, polyurethane resin, hydrophilic organic resin including a polyoxyalkylene group, epoxy resin, and the like may be mentioned. As a content ratio of the porous inorganic particles and the binder component, for example, a ratio such that the binder component is 20 to 400 parts by mass relative to 100 parts by mass of the porous inorganic particles may be mentioned.

On the windshield of the present invention, as the water absorbing antifogging film, an water absorbing antifogging film formed by using the water absorbing resin is preferred. The water absorbing antifogging film formed by using the water absorbing resin will be described below.

The water absorbing antifogging film is preferably constituted only of the water absorbing resin from the viewpoint of water absorbing property. However, depending on the type of the resin to be used, from the viewpoint of wear resistance, the water absorbing antifogging film may be formed in combination with a material with excellent mechanical strength while securing the water absorbing property. Although it depends on the type of the water absorbing resin, the ratio of the water absorbing resin to the total amount of the water absorbing antifogging film is preferably 70 to 100 mass %, more preferably 80 to 100 mass %.

The water absorbing antifogging film may be constituted of a single layer, but for example, may also be a laminated structure constituted of at least two layers formed by using the water absorbing resin of different type, or a laminated structure constituted of at least two layers containing water absorbing resins which are the same but have different contents. As a preferred laminated structure, a laminated structure constituted of two layers including a water absorbing layer having a water absorbing property on the most vehicle-interior side, and a base layer having a lower water absorbing property than the water absorbing layer between the water absorbing layer and the window glass, may be mentioned. In such a laminated structure, since the water absorbing property of the base layer is low, a difference in degree of expansion and contraction is small in an adhesion interface between the window glass and the water absorbing antifogging film, actually between the window glass and the base layer, making it possible to prevent delamination of the water absorbing antifogging film from the window glass. Further, since the water absorbing layer provided on the base layer has a water absorbing property, the water absorbing property of the water absorbing antifogging film is sufficiently secured.

By comparing the difference in water absorbing property of the base layer and the water absorbing layer by the saturated water absorption amount, preferably, the base layer is about 10 to 50 mg/cm$^3$, and the water absorbing layer is about 300 to 600 mg/cm$^3$. On the other hand, from the viewpoint of decreasing the difference in degree of expansion and contraction between the base layer and the water absorbing layer in the water absorbing antifogging film, the difference in saturated water absorption amount between the base layer and the water absorbing layer is preferably in the range of 250 to 590 mg/cm$^3$.

Further, a ratio of film thickness of the base layer and the water absorbing layer depends on the water absorbing property of each layer, and a film thickness ratio between the water absorbing layer and the base layer represented by [film thickness of water absorbing layer/film thickness of base layer] is preferably 3.0 to 6.0, more preferably 3.5 to 5.0. In addition, in the water absorbing antifogging film in each mode, the film thickness ratio between the water absorbing layer and the base layer represented by [film thickness of water absorbing layer/film thickness of base layer] in its entire area is preferably kept substantially constant from the viewpoint that the base layer can alleviate, constantly by a constant ratio, stress generated by the water absorbing layer during water absorption. Specifically, a deviation of [film thickness of water absorbing layer/film thickness of base layer] is preferably ±1.0 or less, more preferably ±0.8 or less.

When the water absorbing antifogging film is constituted of a single layer, this layer is a water absorbing layer having a water absorbing property, and the water absorbing layer when the film is constituted of the base layer and the water absorbing layer is preferably similar to the water absorbing layer when the water absorbing antifogging film is constituted of a single layer. The water absorbing layer constituting the water absorbing antifogging film solely or together with the base layer is preferably structured to contain a water absorbing resin, and further contain functional additive components having various functions as necessary. As the functional additive components, an inorganic filler for increasing mechanical strength of the water absorbing layer, a coupling agent for increasing adhesiveness with the window glass and the black ceramic layer or the base layer which the water absorbing layer is in contact with, a leveling agent, a bubble eliminating agent, a viscosity modifier or the like used for improving film formability, a light stabilizer, an antioxidant, an ultraviolet absorber, an infrared absorber, and so on may be mentioned. The base layer is preferably structured to contain a water absorbing resin having a lower water absorbing property than the water absorbing layer, and further contain functional additive components having various functions similarly to the water absorbing layer as necessary. Components contained in the water absorbing layer and the base layer will be described below.

(Water Absorbing Resin)

As the water absorbing resin, a water absorbing resin is preferred which is capable of retaining the saturated water absorption amount described above in each of the water absorbing layer and the base layer when the water absorbing layer or the base layer is formed by the water absorbing resin solely or by combining with other materials. As the water absorbing resin, a resin having a hydrophilic group or a hydrophilic chain (such as polyoxyethylene group) is used without any particular limitation. The water absorbing resin may either be a linear polymer or a non-linear polymer, but a resin which is a non-linear polymer having a three-dimensional network structure is preferred in aspect of durability or the like.

As the water absorbing resin constituted of a linear polymer, specifically, hydroxypropylcellulose, polyvinyl alcohol, polyvinyl acetal, polyvinylpyrrolidone, polyvinyl acetate, and the like may be mentioned. As the resin which is a non-linear polymer having a three-dimensional network structure, there are a cured product of curable resin, a cross-linked resin resulted from cross-linking of a cross-linking resin, and the like. Normally, the cured product of curable resin and the cross-linked resin are not distinguished.

In this specification, the cured product of curable resin and the cross-linked resin are used in the same meaning. Hereinafter, the cured product of curable resin (hereinafter also referred to as a cured resin) will be used in a meaning including a cross-linked resin, and the curable resin will be used in a meaning including the cross-linking resin. A curable component refers to a combination of a compound (monomer, oligomer, polymer, or the like) having a reactive group and a curing agent. One of reactive compounds of the curable resin may also be called a main agent. The curing agent refers to another reactive compound reacting with the main agent, and also means those called as a reaction initiator, such as a radical generator causing reaction of addition polymerizable unsaturated radical group, and a reaction catalyst, such as lewis acid or the like.

Here, the saturated water absorption amount of the cured resin is proportional to the amount of the hydrophilic group in the cured resin, and thus the saturated water absorption amount of this resin can be controlled by adjusting the amount of the hydrophilic group. As the hydrophilic group, for example, a hydroxyl group, a carboxyl group, a sulfonyl group, an amide group, an amino group, a quaternary ammonium basic group, and an oxyalkylene group may be mentioned. The amount of the hydrophilic group in the cured resin can be controlled by adjusting the amount of the hydrophilic group (for example, a hydroxyl group value) contained in the main agent and/or the curing agent. Further, in the case where the hydrophilic group is formed by curing reaction, the saturated water absorption amount is controllable by adjusting the number of functional groups or cross linkage degree of the main agent and/or the curing agent.

Further, the saturated water absorption amount also depends on the cross linkage degree in the cured resin. When the number of cross-linking points contained per certain unit volume in the cured resin is large, the cured resin becomes a fine three-dimensional network structure, spaces for water retention decrease, and thus it is conceivable that the water absorbing property becomes low. On the other hand, when the cross-linking points contained per unit volume are small, the spaces for water retention increase, and thus it is conceivable that the water absorbing property becomes high. A glass transition point of the cured resin is highly related to the number of cross-linking points in the cured resin, and in general, it is considered that in a resin having a high glass transition point, the number of cross-linking points contained per certain unit volume is large.

Therefore, in general, preferably, the glass transition point of the cured resin is controlled to be low in order to increase the water absorbing property and antifogging performance, and the glass transition point of the cured resin is controlled to be high in order to increase durability. In view of these, the glass transition point of the water absorbing cured resin used for the water absorbing layer is, although depending on the type of the cured resin, preferably 10° C. to 110° C., more preferably 20° C. to 70° C. On the other hand, the glass transition point of the water absorbing cured resin used for the base layer is preferably 30° C. to 80° C., more preferably 40° C. to 60° C.

Note that the glass transition point is a value measured in accordance with JIS K 7121. Specifically, it is a value measured by providing a water absorbing cured resin layer as a sample on a substrate, for example, a soda lime glass substrate, leaving it in an environment at 20° C. with relative humidity of 50% for one hour, and thereafter it is measured by using a differential scanning calorimeter. Additionally, the heating rate during measurement is 10° C./min.

The main agent of the curable resin is not limited in particular as long as it reacts in combination of a compound having two or more reactive groups and a curing agent to become a cured resin. This reaction is started or accelerated by heat or light such as ultraviolet rays. As the reactive group, for example, a group having a polymerizable unsaturated radical group such as vinyl group, acryloyloxy group, methacryloyloxy group, styryl group, or the like, and a reactive group such as epoxy group, amino group, hydroxyl group, carboxyl group, acid anhydride group, isocyanate group, methylol group, ureido group, mercapto group, sulfide group, and the like may be mentioned. Among others, the epoxy group, the carboxyl group, and the hydroxyl group are preferred, and the epoxy group is more preferred. Further, as the main agent, one type may be used, or two or more types may be used together.

When the main agent is a low-molecular compound or an oligomer having a reactive group, the number of reactive groups contained in one molecule is preferably two or more, more preferably 2 to 10. In some cases, a component having only one reactive group may be included, but in this case, the mean number of reactive groups per molecule in the curable component is preferably 1.5 or more.

As such a curable resin, for example, there are a curable acrylic resin constituted of a combination of a main agent constituted of a low-molecular compound (monomer) and/or an oligomer having two or more acryloyloxy groups and a curing agent which is a radical generator, an epoxy resin constituted of a combination of a main agent constituted of a low-molecular compound and/or an oligomer or the like having two or more epoxy groups and a curing agent which is a compound having two or more reactive groups reactive with an epoxy group such as an amino group, an epoxy resin constituted of a combination of a main agent constituted of a low-molecular compound and/or an oligomer or the like having two or more epoxy groups and a curing agent which is a curing catalyst (such as lewis acid or base), a curable urethane resin constituted of a combination of a polyol such as a low-molecular compound and/or an oligomer having two or more hydroxyl groups and a polyisocyanate (curing agent) which is a compound having two or more isocyanate groups, and the like. By using a photopolymerization initiator as the curing agent of the curable acrylic resin, a light-curing acrylic resin can be made, and by using a light-curing agent (for example, a compound generating lewis acid or the like by irradiation of light) as the curing agent of the epoxy resin, a light-curing epoxy resin can be made.

In the present invention, a cured product of the epoxy-based resin is preferably used as the water absorbing resin. In the present invention, the epoxy-based resin refers to curable resins including the following curable components.
(A) A combination of a low-molecular compound and/or an oligomer having two or more epoxy groups and a curing agent.
(B) A combination of a polymer having two or more epoxy groups and a curing agent.

The number of epoxy groups per molecule in the low-molecular compound and/or an oligomer as the main agent of the epoxy-based resin in above (A) is preferably 2 to 10. As the curing agent, a low-molecular compound having two or more reactive groups such as amino groups or a curing catalyst can be used, and the both can be used together. The curing agent may be an oligomer or a polymer, and for example, a polyamide oligomer, a polyamide polymer, an oligomer or a polymer having an amino group or a carboxyl group in a side chain, or the like can be used as the curing agent. Moreover, a light-curing agent can be used as the curing agent to make a light-curing epoxy-based resin.

As the polymer as the main agent of the epoxy-based resin in above (B), a copolymer of an acrylic monomer such as acrylate or methacrylate and a copolymer of an acrylic monomer and another monomer are preferred. By using an acrylic monomer having an epoxy group as a part of the acrylic monomer, a polymer having an epoxy group can be obtained. By using a monomer having an epoxy group other than the acrylic monomer, a polymer having a similar epoxy group can also be obtained. The number of epoxy groups per molecule in the polymer having an epoxy group is preferably 1 to 20. As the curing agent, a low-molecular compound and/or an oligomer having two or more reactive groups such as amino groups is preferred.

The epoxy-based resin of the type (A) normally called an epoxy resin is categorized into glycidyl ether-based epoxy resin, glycidyl ester-based epoxy resin, glycidyl amine-based epoxy resin, cyclic aliphatic epoxy resin, and the like, by type of the low-molecular compound and/or an oligomer (they will be hereinafter referred to as a polyepoxide) having two or more epoxy groups as the main agent.

The main agent of the glycidyl ether-based epoxy resin is constituted of a polyepoxide (or an oligomer of the polyepoxide thereof) having a structure in which a phenolic hydroxyl group of polyphenols having two or more phenolic hydroxyl groups or an alcoholic hydroxyl group of polyols having two or more alcoholic hydroxyl groups is substituted with a glycidyloxy group.

Similarly, the main agent of the glycidyl ester-based epoxy resin is constituted of a polyepoxide having a structure in which a carboxyl group of polycarboxylic acid having two or more carboxyl groups is substituted with a glycidyloxycarbonyl group, and the main agent of the glycidyl amine-based epoxy resin is constituted of a polyepoxide having a structure in which hydrogen atoms bonded to a nitrogen atom of an amine having two or more hydrogen atoms bonded to a nitrogen atom are substituted with a glycidyl group. Moreover, the main agent of the cyclic aliphatic epoxy resin is constituted of a polyepoxide having an alicyclic hydrocarbon group (such as 2,3-epoxycyclohexyl group) in which an oxygen atom is bonded between adjacent carbon atoms of a ring.

As the water absorbing resin used for the water absorbing layer, a cured product of an epoxy-based resin whose main agent is a polyepoxide having no aromatic ring is preferred in respect for that high water absorbing property can be obtained, and specifically, a cured product of an epoxy-based resin whose main agent is glycidyl ether-based polyepoxide derived from polyols is preferred.

On the other hand, a cured product of an epoxy-based resin whose main agent is a glycidyl ether-based polyepoxide derived from polyphenols has a relatively low water absorbing property. This is conceivably because the latter cured product of the epoxy-based resin has an aromatic ring such as a benzene ring, and this aromatic ring is hard and gives a low-water absorbing property nature to the resin. Therefore, for the base layer, the cured product of an epoxy-based resin whose main agent is a glycidyl ether-based polyepoxide derived from polyphenols is preferably used. In addition, if a predetermined water absorbing property can be obtained, the epoxy-based resin whose main agent is a glycidyl ether-based polyepoxide derived from polyphenols may be used for the water absorbing layer.

As the glycidyl ether-based polyepoxide derived from polyphenols, specifically, bisphenol-type diglycidyl ethers such as bisphenol-A diglycidyl ether, bisphenol-F diglycidyl ether, and bis(4-glycidyloxyphenyl), phenol-novolac diglycidyl ethers, cresol-novolac diglycidyl ethers, aromatic polycarboxylic acid polyglycidyl esters such as diglycidyl phthalate, and the like may be mentioned. Among these aromatic polyepoxides, the bisphenol-A diglycidyl ether or the bisphenol-F diglycidyl ether is preferably used.

A glycidyl ester-based polyepoxide, a glycidyl amine-based polyepoxide, and a cyclic aliphatic polyepoxide are suitable as the main agent of the epoxy-based resin as a material of the water absorbing resin as long as it is a compound having no aromatic ring. In addition, an aromatic polyol is known as material polyols for a polyepoxide, but the above-described glycidyl ether-based polyepoxide derived from polyols refers to a glycidyl ether-based polyepoxide derived from polyols having no aromatic ring.

From the same reason as above, in the water absorbing layer, in the epoxy-based resin as a material of the water absorbing resin, the curing agent also is preferably a compound having no aromatic ring. However, when the curing agent is a reaction catalyst, it may be a compound having an aromatic ring because its amount to be used is small. When the curing agent is a reactive compound having a reactive group reacting with the main agent, if the polyepoxide is one having no aromatic ring, the cured product obtained from the combination of it with the curing agent becomes a cured resin having relatively many aromatic rings, where there is a concern that its water absorbing property becomes insufficient.

On the other hand, in the case of the base layer, when the polyepoxide having an aromatic ring as described above is used as the main agent of the epoxy-based resin which is a material of the water absorbing resin, the curing agent may either be a compound having an aromatic ring or a compound having no aromatic ring.

Thus, as the water absorbing resin used for the water absorbing layer, an epoxy-based resin of a combination of the main agent constituted of a polyepoxide having no aromatic ring and a reactive compound having no aromatic ring is particularly preferred. As the polyepoxide having no aromatic ring, a glycidyl ether-based polyepoxide is preferred. Similarly, a glycidyl ester-based polyepoxide, a glycidyl amine-based polyepoxide, a cyclic aliphatic polyepoxide, or the like, which can be obtained from polyols having no aromatic ring or amines having no aromatic ring, are preferred as the main agent of the epoxy-based resin for obtaining the water absorbing resin used for the water absorbing layer. A most preferred polyepoxide having no aromatic ring is a glycidyl ether-based polyepoxide.

As the material polyol of the glycidyl ether-based polyepoxide derived from polyols, there are polyols having no aromatic ring such as aliphatic polyols and alicyclic polyols, and the number of hydroxyl groups per molecule thereof is preferably 2 to 8, more preferably 2 to 4. Hereinafter, such polyols having no aromatic ring will be referred to as aliphatic polyols. As the aliphatic polyols, there are an alkane polyol, an etheric oxygen atom-containing polyol, a sugar alcohol, a polyoxyalkylene polyol, a polyester polyol, and the like. The polyoxyalkylene polyol can be obtained by ring-opening addition polymerization of a monoepoxide such as a propylene oxide or an ethylene oxide to a polyol of relatively low molecular weight, such as alkane polyol, an etheric oxygen atom-containing polyol, a sugar alcohol, or the like. As the polyester polyol, there are compounds having a structure in which aliphatic diol and aliphatic dicarboxylic acid are condensed, compounds having a structure in which a cyclic ester underwent ring-opening polymerization, and the like.

As the glycidyl ether-based polyepoxide derived from polyols, glycerol polyglycidyl ether, diglycerol polyglycidyl ether, polyglycerol polyglycidyl ether, trimethylolpropane polyglycidyl ether, pentaerythritol polyglycidyl ether, sorbitol polyglycidyl ether, and the like may be mentioned. Among others, particularly glycerol polyglycidyl ether, diglycerol polyglycidyl ether, polyglycerol polyglycidyl ether, and sorbitol polyglycidyl ether are preferred.

As polyepoxides other than the glycidyl ether-based polyepoxide, for example, diglycidyl hexahydrophthalate, diglycidyl tetrahydrophthalate, 3,4-epoxycyclohexylmethyl-3'4'-epoxycyclohexane carboxylate, bis(3,4-epoxycyclohexylmethyl) adipate, and the like may be mentioned.

The molecular weight of a polyepoxide is, from the viewpoints of durability, appearance, and the like, preferably 200 to 3000, more preferably 300 to 2000, particularly preferably 300 to 1800. Further, an epoxy equivalent of the polyepoxide (the number of grams [g/eq] of a resin containing epoxy groups equivalent to one gram) is preferably 120 to 200 g/eq, more preferably 130 to 190 g/eq.

Note that the molecular weight in this specification refers to as a mass average molecular weight (Mw) unless otherwise particularly stated. Further, the mass average molecular weight (Mw) in this specification refers to a mass average molecular weight with reference to polystyrene measured by gel permeation chromatography (GPC).

As the curing agent in an epoxy-based resin, there may be mentioned a compound having two or more reactive groups reactive with epoxy groups such as polyamines, polycarboxylic acid anhydrides, polyamides, polythiols, and the like, and a curing catalyst such as tertiary amines, imidazoles, lewis acids, onium salts, dicyandiamides, organic acid dihydrazides, phosphines, and the like. As the compound having two or more reactive groups, polyamines having no aromatic ring and polycarboxylic acid anhydrides are preferred, and as the curing catalyst, tertiary amines, imidazoles, phosphines, and allyl sulfonium salts are preferred. Further, as the curing catalyst, a light-curing catalyst constituting a light-curing epoxy-based resin is also preferred. Moreover, the compound having two or more reactive groups and the curing catalyst can be used together, and particularly a combination of the polyamines and the curing catalyst is preferred. Hereinafter, the compound having two or more reactive groups will be referred to as a polyaddition type curing agent, and the curing catalyst will be referred to as a catalyst type curing agent.

As the polyaddition type curing agent, polyamines, polycarboxylic acid anhydrides, polyamides, and the like can be used. In order to obtain a water absorbing resin with high water absorbing property, a reactive compound having no aromatic ring similarly to a polyepoxide is preferred. As the polyaddition type curing agent, polyamines having no aromatic ring and polycarboxylic acid anhydrides having no aromatic ring are preferred, and particularly polyamines having no aromatic ring is preferred. As the polyamines, polyamines having 2 to 4 amino groups are preferred, and as the polycarboxylic acid anhydrides, a dicarboxylic acid anhydride, a tricarboxylic acid anhydride, and a tetracarboxylic acid anhydride are preferred.

As the polyamines having no aromatic ring, an aliphatic polyamine compound and an alicyclic polyamine compound are preferred. As these polyamines, specifically, an ethylenediamine, a triethylenetetramine, a tetraethylenepentamine, a hexamethylene diamine, a polyoxyalkylene polyamine, an isophoronediamine, a menthenediamine, a 3,9-bis(3-aminopropyl)-2,4,8,10-tetraoxaspiro(5,5)undecane, and the like may be mentioned. The polyoxyalkylene polyamine is a polyamine having a structure in which the hydroxyl group of a polyoxyalkylene polyol is substituted with an amino group, and for example, there is a compound having 2 to 4 amino groups having a structure in which the hydroxyl group of a polyoxypropylene polyol having 2 to 4 hydroxyl groups is substituted with an amino group. The molecular weight per amino group thereof is preferably 1000 or less, particularly preferably 500 or less.

As the polycarboxylic acid anhydride having no aromatic ring, for example, a succinic anhydride, a methyltetrahydrophthalic anhydride, a hexahydrophthalic anhydride, a 4-methylhexahydrophthalic anhydride, and the like may be mentioned.

As the catalyst type curing agent, for example, a 2-methylimidazole, a 2-ethyl-4-methylimidazole, a tris(dimethylaminomethyl)phenol, a boron trifluoride-amine complex, a dicyandiamide, and the like may be mentioned. Further, as a catalyst type curing agent giving a light-curing epoxy resin, for example, an onium salt which decompose by light such as ultraviolet rays to generate a lewis acid catalyst, such as a diphenyliodonium hexafluorophosphate, a triphenyl sulphonium hexafluorophosphate, and the like may be mentioned.

The ratio of combining the polyepoxide and the curing agent is preferably such as to cause, when the curing agent is a polyaddition type curing agent, an equivalent ratio of a reactive group of the polyaddition type curing agent to the epoxy group to be about 0.8 to 1.2. However, when it is used together with the catalyst type curing agent, it may be less than this ratio. Further, when the mass ratio is too large, physical properties of the cured product easily become inadequate, and thus the polyaddition type curing agent is preferably 40 parts by mass or less relative to 100 parts by mass of the polyepoxide. The amount of use of the catalyst type curing agent is preferably 2 to 20 parts by mass relative to 100 parts by mass of the polyepoxide. When the amount of use of the catalyst type curing agent is 2 parts by mass or more, the reaction proceeds sufficiently, and sufficient water absorbing property and durability can be realized. Further, when the use amount of the catalyst type curing agent is 20 parts by mass or less, it is easy to prevent problems in appearance such as yellowing of the cured product due to remaining of a curing agent residue in the obtained cured product.

To the epoxy-based resin constituted of a combination of a polyepoxide and a curing agent, it is also possible to compound a reactive additive or a non-reactive additive other than them. As the reactive additive, a compound having one reactive group reactive with an epoxy base such as an alkyl monoamine, a coupling agent having an epoxy group or an amino group, and the like may be mentioned. In an epoxy-based resin constituted of a combination of a polyepoxide, a curing agent, and an additive of an optional component, the content of the polyepoxide relative to the total epoxy-based resin amount is preferably 40 to 80 mass %. Further, the total amount of the curing agent is preferably 40 mass % or less.

Commercially available products can be used for the above-described polyepoxides, curing agents, and combinations thereof (epoxy resins). As ones used preferably for the water absorbing layer as such commercially available products, specifically, as an aliphatic glycidyl ether-based polyepoxide, Denacol EX-313 (molecular weight (Mw): 383, average number of epoxy groups: 2.0/molecule) and Denacol EX-314 (molecular weight (Mw): 454, average number of epoxy groups: 2.3/molecule) which are glycerol polyglycidyl ether, and Denacol EX-512 (molecular weight (Mw): 630, average number of epoxy groups: 4.1/molecule) and Denacol EX-521 (molecular weight (Mw): 1294, average number of epoxy groups: 6.3/molecule) which are polyglycerol polyglycidyl ether, and the like may be mentioned, which are product names made by Nagase ChemteX.

Further, as ones used preferably for the water absorbing layer, Denacol EX-1410 (molecular weight (Mw): 988, average number of epoxy groups: 3.5/molecule), Denacol EX-1610 (molecular weight (Mw): 1130, average number of epoxy groups: 4.5/molecule), and Denacol EX-610U (molecular weight (Mw): 1408, average number of epoxy groups: 4.5/molecule) which are aliphatic polyglycidyl ether, and the like may be mentioned. As a sorbitol polyglycidyl ether, Denacol EX-614B (molecular weight (Mw): 949, average number of epoxy groups: 6.1/molecule) and the like may be mentioned. Note that these polyepoxides may be used solely or two or more of them may be used together.

Further, as a commercial product used preferably for the base layer, jER828 (product name, Mitsubishi Chemical Corporation, molecular weight (Mw): 340, average number of epoxy groups: about 2/molecule) which is a bisphenol-A diglycidyl ether, and the like may be mentioned.

As the curing agent, Jeffamine T403 (product name, made by Huntsman) may be mentioned as a polyoxyalkylene triamine. As a triarylsulfonium salt which is a light-curing catalyst, Adeka Optomer SP-152 (product name, made by Adeka) and the like may be mentioned.

The water absorbing resins contained in the water absorbing layer and the base layer have been described above. Hereinafter, respective components other than the water absorbing resins will be described as components contained in the water absorbing antifogging film without distinguishing the water absorbing layer and the base layer.

(Inorganic Filler)

An inorganic filler is a component which can give higher mechanical strength and heat resistance to the water absorbing antifogging film by adding it. Further, when a cured resin is used as the water absorbing resin, curing contraction of the resin during curing reaction can also be reduced. As such an inorganic filler, a filler constituted of a metal oxide is preferred. As the metal oxide, for example, silica, alumina, titania, and zirconia may be mentioned, and among others, silica is particularly preferred.

Further, besides the filler constituted of the above metal oxide, a filler constituted of ITO (Indium Tin Oxide) can also be used. Since ITO has an infrared absorbing property, it can give a heat ray absorbing property to the water absorbing antifogging film. Thus, when the filler constituted of ITO is used, an antifogging effect by heat ray absorption can be expected in addition to the water absorbing property.

These inorganic fillers contained in the water absorbing antifogging film are preferably in a particle form. Further, a mean particle diameter thereof is preferably 0.01 μm to 0.3 μm, more preferably 0.01 μm to 0.1 μm. Further, the compounding amount of inorganic filler is, when a cured resin is used as the water absorbing resin, preferably 1 to 20 parts by mass, more preferably 1 to 10 parts by mass relative to 100 parts by mass of the total mass of the main agent and the curing agent. When a linear polymer is used as the water absorbing resin, its compounding amount is preferably 0.5 to 5.3 parts by mass relative to 100 parts by mass of the water absorbing resin. When the compounding amount of the inorganic filler relative to 100 parts by mass of the water absorbing resin is equal to or more than the above-described lower limit value, mechanical strength can be given to the water absorbing antifogging film. Further, when the cured resin is used, decrease in effect of reducing curing contraction can be easily suppressed. Further, when the compounding amount of the inorganic filler is equal to or less than the above upper limit value, spaces for water absorption can be secured sufficiently, and the water absorbing property and the antifogging property can be increased easily.

In addition, silica, more preferably silica particles, used preferably as the inorganic filler can be compounded in a composition for forming water absorbing antifogging film, which will be described later, as colloidal silica dispersed in water or organic solvent such as methanol, ethanol, isobutanol, propylene glycol monomethyl ether, butyl acetate, or the like. As the colloidal silica, there are silica hydrosol dispersed in water, and organosilica sol in which water is replaced with an organic solvent. When compounding in the composition for forming water absorbing antifogging film, silica hydrosol or organosilica sol is used corresponding to a solvent used preferably in this composition. For example, when the solvent used in the composition for forming water absorbing antifogging film is an organic solvent, organosilica sol using an organic solvent similar to that as a dispersion medium is used preferably.

As such organosilica sol, commercially available products can be used. As the commercially available products, for example, an organosilica sol IPA-ST (product name, made by Nissan Chemical Industries, Ltd.) in which silica particles having a mean primary particle diameter of 10 nm to 20 nm are dispersed in an isopropanol by a ratio of 30 mass % as $SiO_2$ content to the total organosilica sol amount, an organosilica sol MEK-ST (product name, made by Nissan Chemical Industries, Ltd.) in which the organic solvent of the organosilica sol IPA-ST is replaced from isopropanol to methylethylketone, an organosilica sol NBAC-ST (product name, made by Nissan Chemical Industries, Ltd.) in which the organic solvent of the organosilica sol IPA-ST is replaced from isopropanol to butyl acetate, and the like may be mentioned. In addition, when colloidal silica is used as the silica particles, the amount of solvent to be compounded in the composition for forming water absorbing antifogging film is adjusted appropriately in view of the solvent amount contained in the colloidal silica.

Further, the inorganic filler is compounded as, for example, a silica precursor such as tetraethoxysilane in the composition for forming water absorbing antifogging film, and may exist as silica in the coating film when the water absorbing antifogging film is formed. As such a silica precursor, a silicate compound such as tetramethoxysilane, monomethyl triethoxysilane, monomethyl trimethoxysilane, dimethyl dimethoxysilane, dimethyl diethoxysilane, or the like can be used besides the above tetraethoxysilane.

For alumina, titania, zirconia, and so on exemplified as the inorganic filler besides silica, alcoxide or acetylacetonate may be used as the precursor thereof, and particularly for zirconium, zirconium chloride can also be used.

(Coupling Agent)

The coupling agent is added to the composition for forming water absorbing antifogging film and is a component operating to increase adhesiveness between the water absorbing antifogging film and the window glass and the black ceramic layer in contact therewith, or between respective layers constituting the water absorbing antifogging film, when the water absorbing antifogging film is formed. In addition, when the coupling agent has a reactive group, it increases adhesiveness by reaction of the reactive group with other components or the like constituting the water absorbing antifogging film, and thus the coupling agent compounded in the composition for forming water absorbing antifogging film exists in a form changed more or less after the water absorbing antifogging film is formed. Hereinafter, the coupling agent added to the composition for forming water absorbing antifogging film will be described.

Note that when the cured resin is used as the water absorbing resin and the coupling agent compounded as an optional component has a functional group having reactivity with the main agent or the curing agent, the coupling agent can also be used for the purpose of adjusting physical properties of the water absorbing antifogging film other than for the purpose of improving adhesiveness.

Here, when the curable resin includes an epoxy-based resin, the composition for forming water absorbing antifogging film is preferred to contain a coupling agent, and as such a coupling agent, an organic metal-based coupling agent or a polyfunctional organic compound is preferred.

As the organic metal-based coupling agent, for example, a silane-based coupling agent, a titanium-based coupling agent, an aluminum-based coupling agent, and the like may be mentioned, and the silane-based coupling agent is preferred. When these coupling agents are used together with the curable resin, they preferably have a reactive group which can react with reactive groups of the main agent and/or the curing agent. Here, the coupling agent is preferably a compound having one or more (preferably one or two) bondings between a metal atom and a carbon atom. As the organic metal-based coupling agent, particularly the silane-based coupling agent is preferred.

As the silane-based coupling agent, 3-aminopropyl trimethoxysilane, 3-aminopropyl methyldimethoxysilane, N-(2-aminoethyl)-3-aminopropyl methyldimethoxysilane, N-(2-aminoethyl)-3-aminopropyl trimethoxysilane, 3-glycidoxypropyl trimethoxysilane, 3-glycidoxypropyl triethoxysilane, 3-glycidoxypropyl methyldiethoxysilane, 3-methacryloxypropyl methyldimethoxysilane, 3-methacryloxypropyl trimethoxysilane, 3-acryloxypropyl trimethoxysilane, and the like may be mentioned.

The use amount of the coupling agent in the composition for forming water absorbing antifogging film has no lower limit since it is not a necessary component. However, in order for the coupling agent compounding to sufficiently exhibit its effect, the mass ratio of the coupling agent is preferably 0.1 mass % or more, more preferably 0.5 mass % or more relative to the total mass of the water absorbing resin (main agent and curing agent in the case of a cured resin) and the coupling agent. The upper limit of the use amount of the coupling agent is, although limited by physical properties and functions of the coupling agent, preferably about 20 mass % or less, more preferably 15 mass % or less relative to the total mass of the water absorbing resin (main agent and curing agent in the case of a curable resin) and the coupling agent.

(Other Functional Additive Components)

Among other functional additive components, there may be mentioned polydimethylsiloxane-based surface adjuster (for example, BYK307 (product name, made by BYK-Chemie) as a commercially available product), acryl-based copolymer surface adjuster, fluorine-modified polymer-based surface adjuster, and the like as the leveling agent, organic-based bubble eliminating agent such as silicone-based bubble eliminating agent, surfactant, polyether, higher alcohol, and the like as the bubble eliminating agent, and acryl copolymer, polycarboxylic acid amide, urea-modified compound, and the like as the viscosity modifier.

As the light stabilizer, hindered amines; nickel complexes such as nickelbis(octylphenyl)sulfide, nickel complex-3,5-di-tert-butyl-4-hydroxybenzyl phosphate monoethylate, nickel dibutyldithiocarbamate, and the like may be mentioned. As a commercial product of the light stabilizer, bis-(1,2,2,6,6-pentamethyl-4-piperidyl)sebacate (ADK STAB LA-72 (product name, made by ADEKA Corporation)) which is categorized as hindered amines can be exemplified.

As the antioxidant, phenol-based antioxidant of the type suppressing oxidation of resin by capturing and decomposing peroxy radicals, phosphorus-based antioxidant and sulfur-based antioxidant of the type suppressing oxidation of resin by decomposing peroxide, and the like may be mentioned. In the present invention, preferably, the phenol-based antioxidant is used. As a commercially available product of the phenol-based antioxidant, ADK STAB AO-50 (product name, made by ADEKA Corporation) and the like may be mentioned.

As the ultraviolet absorber, conventionally publicly known ultraviolet absorbers, specifically, benzophenone-based compound, triazine-based compound, benzotriazole-based compound, and the like may be mentioned. As a more specific ultraviolet absorber, 2-(2-hydroxy-4-[1-octylcarbonylethoxy]phenyl)-4,6-bis(4-phenylphenyl)-1,3,5-triazine, TINUVIN 400 (product name, made by BASF) may be mentioned.

For each component, also two or more exemplified compounds may be used together. The content of each type of components in the composition for forming water absorbing antifogging film can be 0.001 to 10 parts by mass relative to 100 parts by mass of the water absorbing resin (total of the main agent and the curing agent in the case of the cured resin) with respect to each component.

The water absorbing antifogging film containing the water absorbing resin can be formed by, for example, preparing the composition for forming water absorbing antifogging film containing the water absorbing resin (main agent and curing agent in the case of a cured resin) and further containing the above-described various functional additive components as necessary, and applying and drying, or drying and thereafter curing (cross-linking) as necessary, this composition for forming water absorbing antifogging film on the main surface on the vehicle-interior side of the window glass so that its end portion is located within the formation area of the black ceramic layer. When the water absorbing antifogging film has a laminated structure having two or more layers, for example, when it is constituted of a base layer with a low water absorbing property and a water absorbing layer with a high water absorbing property, a predetermined composition is prepared for each of the layers, and predetermined application and drying or application, drying, and curing (cross-linking) are performed corresponding to the composition used in each of the layers.

Here, control of film thickness so that the film thickness of the water absorbing antifogging film falls within the range of the present invention is normally performed by controlling the film thickness of a coated film when the composition for forming water absorbing antifogging film is applied. As a method of applying the composition for forming water absorbing antifogging film, flow coating, spin coating, spray coating, flexographic printing, screen printing, gravure printing, roll coating, meniscus coating, die coating, wiping, and the like may be mentioned. Film thickness control of coating is possible by any of these methods. In addition, in respect of easiness of film thickness control, flow coating, spin coating, and spray coating are preferred among them. Further, as an application method for forming the water absorbing antifogging film having a film thickness gradually increasing from the upper side toward the lower side as in the cross-section illustrated in FIG. 2, particularly preferred is flow coating, specifically, method to supply and let flow the composition for forming water absorbing antifogging film from the upper side on the vehicle-interior side surface of the glass plate having the black ceramic layer, which is set substantially vertically so that the upper side is a top side. Moreover, control of the formation area of the entire water absorbing antifogging film may be performed by a conventionally publicly known method, for example, method by masking, or the like.

When a curable resin of solid or high viscous liquid is used, the composition for forming water absorbing antifogging film preferably includes a solvent for improving workability of application. In general, reaction of the main agent and the curing agent of the curable resin is carried out after it is applied as the composition for forming water absorbing antifogging film on the above-described predetermined area of the main surface on the vehicle-interior side of the window glass. However, when the composition includes a solvent, these components may be brought to reaction to a certain degree in advance in the composition before the application, and thereafter the composition may be applied on the above-described area on the main surface of the vehicle-interior side of the window glass, dried, and thereafter brought to further reaction. When the main agent and the curing agent are thus brought to reaction to a certain degree in advance as the composition for forming water absorbing antifogging film in the solvent, a reaction temperature for the reaction in advance is preferably 40° C. or more since it makes the curing reaction proceed securely.

The solvent used for the composition for forming water absorbing antifogging film is not particularly limited as long as it is a solvent with good solubility of components such as the main agent and the curing agent, and is a solvent inert to these components. Specifically, alcohols, acetic esters, ethers, ketones, water, and the like may be mentioned.

In addition, when a compound containing epoxy group is used as the main agent and/or the curing agent, if a protonic solvent is used as the solvent, depending on the type, the solvent and the epoxy group react and it is difficult to from the cured resin in some cases. Therefore, when the protonic solvent is used, it is preferred to select a solvent which does not easily react with epoxy compounds. As usable protonic solvents, ethanol, isopropanol, and the like may be mentioned. Further, as solvents other than them, methylethylketone, butyl acetate, propylene carbonate, diethylene glycol dimethyl ether, and the like are preferred.

As these solvents, only one type may be used, or two or more types may be used together. Further, components of the main agent, the curing agent, and the like are prepared as a mixture with a solvent in some cases. In such cases, the solvent contained in the mixture may be used as it is as the solvent in the composition for forming water absorbing antifogging film, or besides this, the same type of solvent or another solvent may further be added to the composition.

Further, when the composition for forming water absorbing antifogging film includes the compound containing epoxy group, the amount of solvent is preferably one to five times the total mass of the compound containing epoxy group, the curing agent, and the coupling agent.

In order to form the water absorbing antifogging film, as a method to apply the composition for forming water absorbing antifogging film obtained above on the predetermined area of the main surface of the vehicle-interior side of the window glass, a method similar to the above-described one may be mentioned. After the composition for forming water absorbing antifogging film is applied, the solvent is removed by drying as necessary, and a curing treatment is performed under conditions corresponding to the curable resin to be used, thereby making a layer of cured resin.

As the curing treatment, specifically, a heat treatment at about 50° C. to 180° C. for 10 to 60 minutes may be mentioned. In the case of a curable resin curing at room temperature, room-temperature curing can also be performed. When the light-curing resin is used, a treatment of performing UV irradiation of 50 to 1000 mJ/cm$^2$ with a UV curing apparatus or the like for 5 to 10 seconds, or the like may be mentioned.

The windshield 1 illustrated in FIG. 1 and FIG. 2 has been described above, but the windshield of the present invention is not limited thereto. The windshield 1 can be changed or modified within the range not departing from the spirit and scope of the present invention.

EXAMPLE

The present invention will be described specifically below with reference to examples, but the present invention is not limited to these examples.

Example 1

Figure 3:
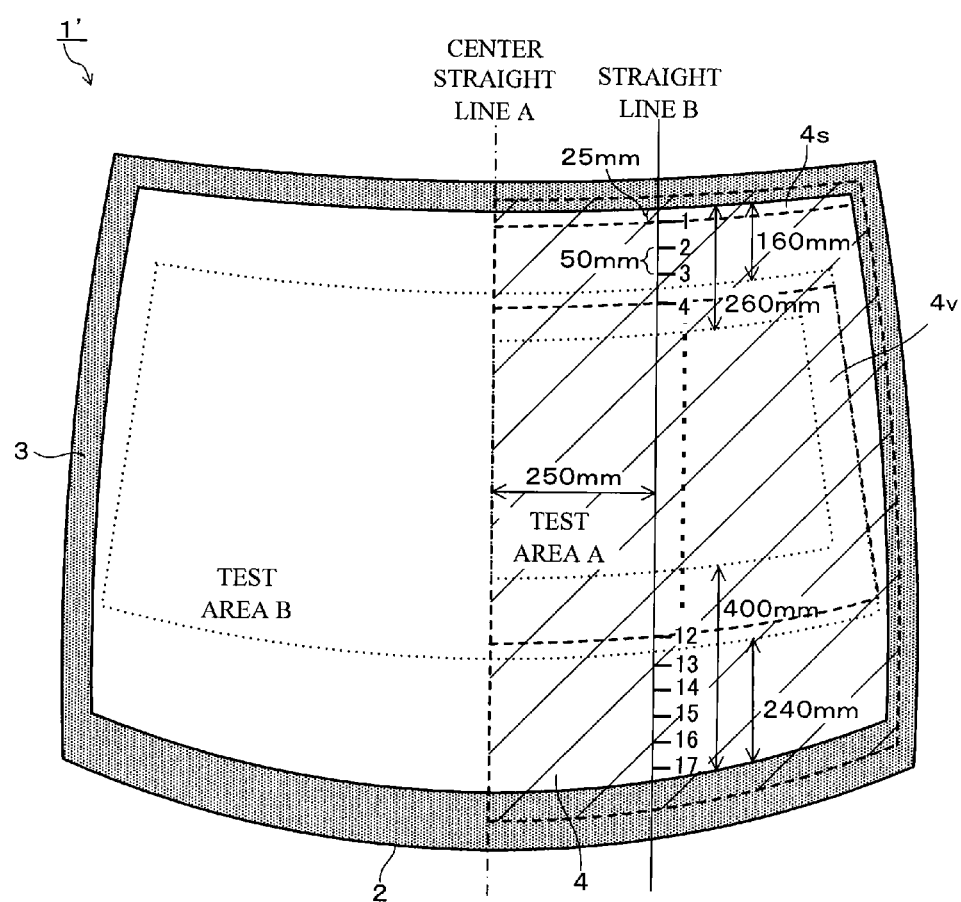
FIG. 3 is a view illustrating a film thickness measuring point of a water absorbing antifogging film on a vehicle windshield of an example.

A vehicle windshield 1' (for right-hand drive) for test, whose front view seen from a vehicle-interior side is illustrated in FIG. 3, was produced and evaluated as follows. In the vehicle windshield 1', the water absorbing antifogging film 4 constituted of the base layer and the water absorbing layer is formed so that, in its peripheral portion, an end portion is located within the formation area of the black ceramic layer 3 on a right half surface seen from the vehicle-interior side of the window glass 2 for windshield of automobile having a black ceramic layer 3. Note that a test area A and a test area B specified in JIS R3212 (1998) in the vehicle windshield 1' are illustrated with dotted lines in FIG. 3. The test area A is an inside area having smaller dimensions out of two areas surrounded by dotted lines, and the test area B is an area outside the test area A and having larger dimensions than the test area A.

First, a composition for forming base layer and a composition for forming water absorbing layer for forming the water absorbing antifogging film 4 were prepared.

<Preparation of Composition for Forming Base Layer>

In a glass container to which a stirrer and a temperature gauge were set, propylene glycol monomethyl ether (150.00 g, made by Daishin Chemical Co., Ltd.), bisphenol-A diglycidyl ether (93.17 g, jER828 (product name, Mitsubishi Chemical Corporation)), polyoxyalkylene triamine (38.20 g, Jeffamine T403 (product name, made by Huntsman)), and aminosilane (18.63 g, KBM903 (product name, made by Shin-Etsu Chemical Co., Ltd.)) were put in and stirred at 25° C. for 30 minutes. Then, it was diluted to five times with propylene glycol monomethyl ether (made by Daishin Chemical Co., Ltd.), and a leveling agent (0.375 g, BYK307 (product name, made by BYK-Chemie)) was added thereto, thereby obtaining a composition for forming base layer A-1).

<Preparation of Composition for Forming Water Absorbing Layer>

In a glass container to which a stirrer and a temperature gauge were set, ethanol (586.30 g, made by Kanto Kagaku), methylethylketone (196.37 g, made by Kanto Kagaku), aliphatic polyglycidyl ether (248.73 g, Denacol EX-1610 (product name, made by Nagase ChemteX)), and glycerin polyglycidyl ether (206.65 g, Denacol EX-313 (product name, made by Nagase ChemteX)) were put in and stirred for 10 minutes. Then, organosilica sol (29.92 g, NBAC-ST (product name, made by Nissan Chemical Industries, Ltd.), mean primary particle diameter: 10 nm to 20 nm, $SiO_2$ content of 30 mass %), and 2-methylimidazole (10.29 g, made by Shikoku Chemicals Corporation) were added and stirring was further performed for 10 minutes. Then, polyoxyalkylene triamine (90.70 g, Jeffamine T403 (product name, made by Huntsman)) was added and stirring was performed at 25° C. for one hour. Then, aminosilane (92.57 g, KBM903 (product name, made by Shin-Etsu Chemical Co., Ltd.)) was added while stirring, and stirring was further performed at 25° C. for three hours. Thereafter, methylethylketone (438.46 g, made by Kanto Kagaku) was added while stirring. Moreover, a leveling agent (0.95 g, BYK307 (product name, made by BYK-Chemie)) was added while stirring, thereby obtaining a composition for forming water absorbing layer A-2).

<Production of the Vehicle Windshield 1'>

As the window glass 2, a window glass (laminated glass in which soda lime glass plates are laminated with an intermediate film being sandwiched therebetween, made by Asahi Glass Co., Ltd.) 2 for the front of an automobile (passenger car) in which the black ceramic layer 3 was formed in a frame form in a peripheral portion on the vehicle-interior side surface was used.

Further, a film forming machine was prepared, which has a tank for retaining a composition for forming a base layer or for forming a water absorbing layer, a metering pump capable of sequentially discharging these compositions at a ratio of 3.0 ml per second with substantially no pulsation, a polytetrafluoroethylene tube with an aperture of a tip of 1.5 mm and a length of about 10 m connected to the metering pump, and a six-axis robot having a hand to which the tip of the tube is fixed to face vertically downward. In addition, during the following film formation, the film forming machine was set so that the six-axis robot moves at a constant speed of 12 mm/second along an application path of the window glass 2.

The main surface on the vehicle-interior side of the window glass 2 was polished and washed with a cerium oxide, the cerium oxide was washed off with pure water, and drying with hot air was performed, thereby obtaining a clean window glass 2. The window glass 2 was placed to stand substantially vertically in a direction such that its lower side is a bottom side in a laboratory at a temperature of 23° C. and with relative humidity of 50%. On a right side (driver's seat side) half surface of the vehicle-interior side main surface of the window glass 2 in this state, the composition for forming base layer A-1) obtained above by using the film forming machine was applied by flow coating. After coated, it was retained for 30 minutes in an air-circulation type oven at a set temperature of 100° C. to form a base layer. Then, on the base layer of the right side (driver's seat side) half surface of the vehicle-interior side main surface of the window glass 2, the composition for forming water absorbing layer A-2) obtained above was applied similarly by flow coating, and it was retained for 30 minutes in the air-circulation type oven at a set temperature of 100° C. to form the water absorbing layer. In this manner, a vehicle windshield 1' was obtained, which has a water absorbing antifogging film 4 constituted of two layers of the base layer and the water absorbing layer only on the right side (driver's seat side) half surface of the vehicle-interior side main surface of the window glass 2, but does not have the water absorbing antifogging film 4 on a left side (passenger's seat side) half surface of the vehicle-interior side main surface.

In addition, setting of the formation area of the water absorbing antifogging film 4 was performed using masking. Specifically, a width up to ⅔ of the width of the black ceramic layer 3 was masked on an inner peripheral side from an outer peripheral end of the black ceramic layer 3 so that the end portion is located on the black ceramic layer 3, and then the water absorbing antifogging film 4 was formed. Further, masking was used also on a boundary of left (not having the water absorbing antifogging film 4) and right (having the water absorbing antifogging film 4) in a center of the window glass 2.

<Evaluation>

With respect to the obtained vehicle windshield 1', measurement of the film thickness, saturated water absorption amount, and the antifogging time of the water absorbing antifogging film 4 was performed as follows. Note that the antifogging time of an ordinary soda lime glass not having undergone an antifogging treatment is 1 to 2 seconds.

(Film Thickness)

With respect to the vehicle windshield 1', a center straight line A along the vehicle windshield 1' was drawn on a center in a left-right direction as illustrated in FIG. 3, and a straight line B along an up-down direction was drawn on a position in parallel to the center straight line A and moved by 250 mm in a right side direction seen from the vehicle-interior side. A point where the straight line B intersects an inner peripheral end of the black ceramic layer 3 on an upper side was assumed as a starting point, and a point was set at a position 25 mm away in a lower side direction on the straight line B from the starting point and was assumed as a measurement point 1. Thereafter, points were set in the lower side direction at intervals of 50 mm from the measurement point 1, thereby setting until a measurement point 17. The measurement point 17 is a point at 15 mm from an inner peripheral end of the black ceramic layer 3 on the lower side. Here, a cross section along the straight line B in the vehicle windshield 1' was substantially the same as the cross section illustrated in FIG. 2 except the difference of whether the water absorbing antifogging film 4 is a single layer or two layers.

Here, which of the test area A and the test area B specified in JIS R3212 (1998) and outside these test areas the position of each measurement point is located in is presented in Table 1. Here, regarding the vehicle windshield 1', upper and lower boundary lines of the visual field area "4$v$" were set to a line in parallel to an upper side of the window glass 2 passing through the measurement point 4 equivalent to a slightly inside of the test area B and a line in parallel to an upper side of the window glass passing through the measurement point 12. Further, left and right boundary lines of the visual field area "4$v$" are set to the same as boundary lines of the test area B. Further, the thin-film area "4$s$" was assumed as an area having a width of 25 mm on an inner peripheral side from an inner peripheral end of the black ceramic layer 3 on an upper side of the water absorbing antifogging film. Which of the thin-film area "4$s$" and the visual field area "4$v$" set in the present invention and outside these areas each of the measurement points is located in is presented in Table 1.

The film thickness of the water absorbing antifogging film was measured from the measurement point 1 to the measurement point 17 by optical interference film thickness measurement method. As the film thickness measurement apparatus, a high-resolution spectroscopic apparatus (UV-NIR, made by Spectra Co-op) to which a halogen light source (LS-100, made by Spectra Co-op) and a measurement probe with a Y-shape fiber (YPR-2000, made by Spectra Co-op) were attached was used. Note that the thickness of the base layer is a value measured immediately after the base layer is formed, and the thickness of the water absorbing layer is a value obtained by subtracting the thickness of the base layer from the total film thickness measured after the water absorbing layer is formed. Measurement results are presented in Table 1.

Further, TT/UT was calculated for each measurement point, where "UT" is the thickness of the base layer and "TT" is the thickness of the water absorbing layer. Moreover, the average of values of TT/UT at the 17 measurement points was obtained, and a deviation from this average was obtained in each measurement point. They are presented together in Table 1.

(Water Absorbing Property and Antifogging Property)

The vehicle windshield 1' obtained above was cut into a rectangular test piece of 30 mm×40 mm so that the measurement point 1 to the measurement point 17 are at the center, and for the water absorbing antifogging film 4 of each test piece, the saturated water absorption amount and the antifogging time (second) were measured by the above method (the antifogging time (seconds) is only of odd-number measurement points from the measurement point 1). In addition, the saturated water absorption amount was 400 (mg/cm$^3$) in the entire area of the water absorbing antifogging film 4 and was constant. For comparison, a water absorbing amount (mg/cm$^2$) per unit area of the test piece was calculated by multiplying the saturated water absorption amount per unit volume by a film thickness. Results are presented in Table 1.

TABLE 1

| | | Water absorbing antifogging film (μm) | | | | | | | | |
|---|---|---|---|---|---|---|---|---|---|---|
| Measurement position | Distance from starting point (mm) | Base layer thickness (UT) | Water absorbing layer thickness (TT) | TT/UT | Deviation | Total film thickness | JIS test area | Area by the present invention | Water absorbing amount per unit area (mg/cm$^2$) | Antifogging time (seconds) |
| 1 | 25.0 | 1.8 | 7.8 | 4.3 | −0.1 | 9.6 | Out of area | Thin-film area | 0.31 | 43 |
| 2 | 75.0 | 2.1 | 9.8 | 4.7 | 0.3 | 11.9 | | Out of area | 0.39 | — |
| 3 | 125.0 | 2.3 | 10.2 | 4.4 | 0.0 | 12.5 | | | 0.41 | 72 |
| 4 | 175.0 | 2.5 | 11.7 | 4.7 | 0.3 | 14.2 | B | Visual field area | 0.47 | — |

TABLE 1-continued

| | | | Water absorbing antifogging film (μm) | | | | | | | |
|---|---|---|---|---|---|---|---|---|---|---|
| Measurement position | Distance from starting point (mm) | Base layer thickness (UT) | Water absorbing layer thickness (TT) | TT/UT | Deviation | Total film thickness | JIS test area | Area by the present invention | Water absorbing amount per unit area (mg/cm²) | Anti-fogging time (seconds) |
| 5 | 225.0 | 2.7 | 12.5 | 4.6 | 0.2 | 15.2 | | | 0.50 | 87 |
| 6 | 275.0 | 2.8 | 13.1 | 4.7 | 0.3 | 15.9 | A | | 0.52 | — |
| 7 | 325.0 | 3.0 | 13.7 | 4.6 | 0.2 | 16.7 | | | 0.55 | 88 |
| 8 | 375.0 | 3.2 | 14.3 | 4.5 | 0.1 | 17.5 | | | 0.57 | — |
| 9 | 425.0 | 3.3 | 14.7 | 4.5 | 0.1 | 18.0 | | | 0.59 | 91 |
| 10 | 475.0 | 3.4 | 15.1 | 4.4 | 0.0 | 18.5 | B | | 0.60 | — |
| 11 | 525.0 | 3.6 | 15.5 | 4.3 | −0.1 | 19.1 | | | 0.62 | 87 |
| 12 | 575.0 | 3.7 | 15.9 | 4.3 | −0.1 | 19.6 | | | 0.64 | — |
| 13 | 625.0 | 3.8 | 16.2 | 4.3 | −0.1 | 20.0 | Out of area | Out of area | 0.65 | 95 |
| 14 | 675.0 | 3.9 | 16.7 | 4.3 | −0.1 | 20.6 | | | 0.67 | — |
| 15 | 725.0 | 4.1 | 17.0 | 4.1 | −0.3 | 21.1 | | | 0.68 | 93 |
| 16 | 775.0 | 4.3 | 17.3 | 4.0 | −0.4 | 21.6 | | | 0.69 | — |
| 17 | 825.0 | 4.7 | 17.6 | 3.7 | −0.7 | 22.3 | | | 0.70 | 92 |

Here, the film thickness of 9.6 μm at the measurement point 1 was the maximum film thickness in the thin-film area "4s". Thus, the relation of the maximum film thickness at this thin-film area "4s" and the minimum film thickness (14.2 μm at the measurement point 4) at the visual field area "4v" is (9.6/14.2)×100=67.6%, which is in the range of the present invention. Further, at each measurement point, the ratio of film thickness of the water absorbing layer and the base layer, TT/UT, is between 3.7 and 4.7, and their deviations from the average is ±0.7 or less.

(Evaluation of Fogging in Actual Vehicle)

An automobile (passenger car) to which the vehicle windshield 1' for test obtained similarly to the above was attached was prepared. In an environment with an outside air temperature of 8° C. and humidity of 50%, from the state of the vehicle in the initial state with an inside air temperature of 8° C. and humidity of 50%, two passengers got inside the vehicle, a humidifier having a humidifying capacity of 250 g per hour was placed at a center of a rear seat, and the vehicle was started to run at about 50 km per hour. The humidifier was activated at the same time as the vehicle was started to run. At this time, the air conditioner of the vehicle is set to inside air circulation, and an air conditioner control switch was set on a heating side by three levels from a center. Further, a blowing position of the air conditioner was set to simultaneous blowing of two positions of foot and face.

After started miming, the passenger's side half surface not having the water absorbing antifogging film 4 of the windshield 1' started to fog rapidly in its entirety within 30 seconds, and the visual field was blocked. On the other hand, the driver's side half surface having the water absorbing antifogging film 4 of the windshield 1', a fogging occurred in the area of the thin-film area "4s" of 25 mm from the inner peripheral end of the black ceramic layer 3 of the upper side portion after one minute had passed from the start of running, but the area therebelow kept a transparent state. Thereafter, the area of the fogging of the driver's side half surface gradually spread downward while running. However, it took 10 minutes for the area of the fogging to reach the boundary of the visual field area "4v" and the set position of the measurement point 4, and it took 12 minutes for the area of the fogging to reach the test area A specified in JIS R3212, which is crucial as a driving visual field.

Further, in an experiment similarly to the above, at a point when a fogging occurred in the thin-film area "4s" of the windshield 1', the blowing position of the air conditioner was switched to include the surface of the windshield F. Thereafter, the area of the fogging did not spread to the visual field area "4v" or the test area A even after, for example, 12 minutes passes, and the fogging was eliminated.

What is claimed is:

1. A vehicle windshield, comprising:
   a window glass;
   a strip-shaped black ceramic layer formed in a peripheral portion of the window glass; and
   a water absorbing antifogging film provided on a vehicle-interior side surface of the window glass;
   wherein the water absorbing antifogging film has a thin-film area located outside a visual field area where a visual field of a driver is ensured in the vehicle windshield and inside an area where the black ceramic layer is formed, the thin-film area having a maximum film thickness in a range of 30% to 70% of a minimum film thickness in the visual field area and having a size recognizable by the driver when a fogging occurs.

2. The vehicle windshield according to claim 1, wherein the visual field area comprises at least a test area A specified in JIS R3212 (1998).

3. The vehicle windshield according to claim 1, wherein the thin-film area of the water absorbing antifogging film is a strip-shaped area having a width of 20 mm or more along at least one side of an inner periphery of the formation area of the black ceramic layer.

4. The vehicle windshield according to claim 3, wherein the water absorbing antifogging film has the thin-film area only on an upper side.

5. The vehicle windshield according to claim 1, wherein the water absorbing antifogging film has a saturated water absorption amount of 300 to 600 mg/cm³, and a minimum film thickness of 8 μm to 17 μm in the visual field area.

6. The vehicle windshield according to claim 1, wherein the water absorbing antifogging film is formed to have a film thickness gradually increasing from the thin-film area toward the visual field area.

7. The vehicle windshield according to claim 1, wherein the water absorbing antifogging film comprises a water absorbing resin.

8. The vehicle windshield according to claim 1,
wherein the water absorbing antifogging film is constituted of a water absorbing layer provided on a most vehicle-interior side and a base layer having a lower water absorbing property than the water absorbing layer, the base layer being provided between the water absorbing layer and the window glass.

9. The vehicle windshield according to claim 8,
wherein a deviation of film thickness ratio of the water absorbing layer and the base layer represented by [film thickness of water absorbing layer/film thickness of base layer] in an entire area of the water absorbing antifogging film is ±1.0 or less.

10. The vehicle windshield according to claim 1,
wherein the water absorbing antifogging film of the visual field area has a water absorption amount of 0.40 mg/cm$^2$ or more.

11. The vehicle windshield according to claim 10,
wherein the water absorbing antifogging film of the visual field area has the water absorption amount of 0.50 mg/cm$^2$ or more.

12. The vehicle windshield according to claim 7,
wherein the water absorbing resin has a glass transition point of 10° C. to 110° C.

13. The vehicle windshield according to claim 8,
wherein the base layer has a glass transition point of 30° C. to 80° C.

* * * * *